US007164828B2

(12) United States Patent
Taboada et al.

(10) Patent No.: US 7,164,828 B2
(45) Date of Patent: Jan. 16, 2007

(54) LASER RIBBON

(76) Inventors: John Martin Taboada, 12718 Cranes Mill, San Antonio, TX (US) 78230;
John Taboada, 12530 Elm Country, San Antonio, TX (US) 78230

( * ) Notice: Subject to any disclaimer, the term of this patent is extended or adjusted under 35 U.S.C. 154(b) by 0 days.

(21) Appl. No.: 10/905,873

(22) Filed: Jan. 25, 2005

(65) Prior Publication Data
US 2006/0165357 A1    Jul. 27, 2006

(51) Int. Cl.
G02B 6/04    (2006.01)
(52) U.S. Cl. ........................................ 385/115; 385/119
(58) Field of Classification Search ................. 385/115
See application file for complete search history.

(56) References Cited
U.S. PATENT DOCUMENTS 4,763,975 A * 8/1988 Scifres et al. .................. 385/33
6,309,886 B1  10/2001 Ambrose
6,470,122 B1 * 10/2002 Doumuki .................... 385/115
6,483,556 B1  11/2002 Karakawa
6,487,334 B1 * 11/2002 Ducellier et al. ............. 385/22

* cited by examiner

Primary Examiner—Jennifer Doan
(74) Attorney, Agent, or Firm—John Martin Taboada

(57) ABSTRACT

A ribbon-of-light projection system projects a substantially uniform ribbon of laser light (or other electromagnetic radiation) using a fiber-optic bundle, plano-mirrors, and a plano-cylindrical lens. Incidence optics directs a laser beam to be incident to the fiber-optic bundle at a predetermined angle of incidence, resulting in the projection of a sheet of light. The sheet of light is then projected towards the cylindrical lens where it is collimated into a ribbon. For the exemplary embodiment, the angle of incidence is orthogonal to the fiber-optic bundle. Thus, the laser projection system converts a beam of laser light (or other electromagnetic radiation such as UV, visible, IR or microwave radiation) into a collimated ribbon of light that in the exemplary embodiment is substantially uniform. In one application, the laser projection technique can be used in industrial applications to monitor the flow of fluids.

17 Claims, 1 Drawing Sheet

LASER RIBBON

FIELD OF THE INVENTION

The present invention relates to alignment, analysis, and reference equipment, particularly to methods and apparatus for generating bands or ribbons of laser light.

DESCRIPTION OF THE RELATED ART

In many industrial applications, having a non-diverging band or ribbon of light is used for robotic vision or surface analysis. Having a simple, accurate, compact, cost-effective, and easy-to-use ribbon of light would be helpful in many different applications. Such bands of light are also used for inspection of fluids and aerosols.

Without limiting the scope of the invention, the background information is provided in the context of a specific problem to which the invention has application: projecting a uniform laser reference band or ribbon with a minimum of complex parts and critical adjustments.

Existing laser band projection systems are limited in the size of band or ribbon that is produced. In U.S. Pat. No. 6,309,886, Ambrose et. al. describes a ribbon that is only 250 microns in width. It is produced by using crossed cylindrical lenses with focal lengths of 1000 mm and 25 mm. In another invention, U.S. Pat. No. 6,483,556, Karakawa et. al. describe making a uniform ribbon using cylindrical asphere lens and a pair of cylinder lenses cemented together. The cylindrical asphere lens converts the laser beam having a circular cross section and Gaussian intensity distribution into a thin line of uniform intensity. The pair of cylindrical lenses cemented back to back keep the line stray collimated at far field. Karakawa does not describe the width of the ribbon but surely it is not on the order of 250 mm. To produce a ribbon with such a width is fairly difficult, requiring several large and complex optical components.

SUMMARY OF THE INVENTION

An object of the invention is to project a ribbon of electromagnetic radiation (such as laser light) without using moving parts, delicate alignment components, or multiple steps. A more specific object of the invention is to project a uniform band of electromagnetic radiation.

These and other objects of the invention are achieved by a ribbon of radiation projection system that includes (a) a beam of electromagnetic radiation (such as a beam of laser light), (b) a bundle of substantially parallel dielectric waveguides, (c) incidence optics, (d) plano-mirrors, and (e) a plano-cylindrical lens. The incidence optics directs the beam to be incident to the bundle of dielectric waveguides at an orthogonal angle of incidence, such that a ribbon of radiation is projected.

In an exemplary embodiment, a solid state laser beam is reflected by incidence optics to the fiber bundle with perpendicular incidence, such that a plane of radiation is projected from the fiber bundle. The beam dimensions are kept within the subtense of the fiber optic bundle. After the plane is formed, the radiation is guided in the forward direction by the plano-mirrors wedged around the fiber bundle. The resulting radiation field is then collimated with a plano-cylindrical lens to produce a uniform ribbon of light.

Embodiments of the invention may be implemented to realize one or more of the following technical advantages of the invention. The laser projection technique converts a beam of laser light (or other electromagnetic radiation such as UV, visible, IR or microwave radiation) into a ribbon of light. The laser ribbon projection system can be economically manufactured to alleviate manufacturing and operational requirements. In one application, the laser ribbon projection technique can be used as a collimated light source for flow analysis.

For a more complete understanding of the invention, and for further features and advantages, reference is now made to the Detailed Description of an exemplary embodiment of the invention, together with the accompanying Drawings, it being understood that the invention encompasses any modifications or alternative embodiments that fall within the scope of the claims.

DETAILED DESCRIPTION OF THE PREFERRED EMBODIMENTS

Figure 1:
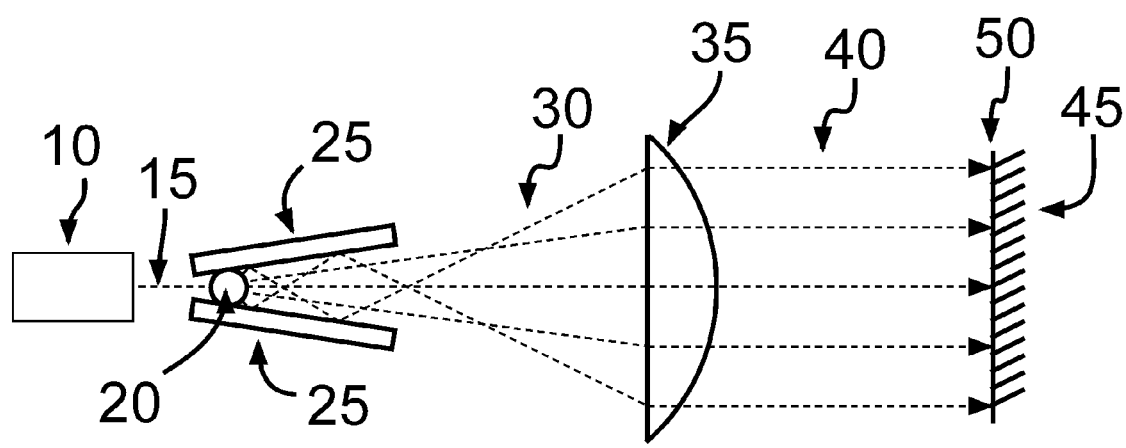
FIG. 1 illustrates projecting a laser ribbon according to the invention using a laser beam incident perpendicular to a fused fiber optic bundle wedged between plano mirrors and collimated with a plano-cylindrical lens.

This Detailed Description describes an exemplary embodiment of the laser ribbon projection system used to convert a laser beam into a projected ribbon of laser light. The term "ribbon" is used to refer to a band of any form of collimated electromagnetic radiation (i.e., a "ribbon of radiation"), including visible laser light, but also including non-visible electromagnetic radiation (such as UV, infrared, and millimeter wave).

The exemplary laser ribbon projection system involves directing a laser beam orthogonal to a fiber-optic bundle, i.e., a fused bundle of individual fiber optic filaments. The incident laser light is projected radially outward from the fiber optic bundle forming a laser light plane. Since the fused bundle of individual fiber optic filaments is wedged between plano-mirrors, the laser light is projected in the forward direction. This laser light is then collimated with a plano-cylindrical lens having a focal length of about 270 mm. A ribbon of laser light results having a width of nearly 26 cm.

FIG. 1 illustrates the laser ribbon projection technique, projecting a laser ribbon according to the invention using a laser beam incident perpendicular to a fused fiber optic bundle wedged between plano mirrors and collimated with a plano-cylindrical lens.

A laser beam source 10 directs beam 15 to a fiber-optic bundle 20 wedged between two plano-mirrors 25 such that the incident angle to the fiber-optic bundle is substantially 90 degrees. The incident laser beam is isotropically scattered through 360 degrees to project a uniform triangular region of light 30. This light is then collimated with a plano-cylindrical lens 35 to create a uniform band or ribbon of light 40. The ribbon of light may then be projected onto a surface 45 to project a uniform line 50.

Alternatively, beam source 10 may be another source of collimated light, or another source of collimated electromagnetic radiation such as a maser or other form of microwave beam emitter.

The exemplary fiber optic bundle 20 is of conventional manufacture and configuration. The bundle is formed by fused individual fibers of stepped or gradient index, well known in the art.

It is understood that the present invention is not limited to the embodiments described above, but encompasses any and all embodiments within the scope of the following claims.

What is claimed is:

1. A ribbon of radiation projection system comprising:
   a. a source of a beam of electromagnetic radiation;
   b. a bundle of substantially parallel dielectric waveguides;
   c. a cylindrical lens;
   d. incidence optics, optically coupled to the beam source, that directs the beam, to be incident to the bundle of dielectric waveguides at a predetermined angle of incidence to generate a plane of radiation;
   e. such that a portion of the plane of radiation is collimated by the cylindrical lens into a ribbon of radiation;
   f. wherein the bundle of dielectric waveguides comprises a fiber-optic bundle of waveguides placed in between mirrors to increase the efficiency of the ribbon of radiation.

2. The ribbon of radiation projection system of claim 1, wherein the fiber-optic bundle is formed by fused optical fibers.

3. The ribbon of radiation projection system of claim 1, wherein the fibers have characteristic transverse dimensions on the order of the wavelength of the radiation.

4. A ribbon of radiation projection system comprising:
   a. a source of a beam of electromagnetic radiation;
   b. a bundle of substantially parallel dielectric waveguides;
   c. a cylindrical lens;
   d. incidence optics, optically coupled to the beam source, that directs the beam, to be incident to the bundle of dielectric waveguides at a predetermined angle of incidence to generate a plane of radiation;
   e. such that a portion of the plane of radiation is collimated by the cylindrical lens into a ribbon of radiation;
   f. wherein the bundle of dielectric waveguides comprises a bundle of substantially cylindrical rod elements with radially varying dielectric constants.

5. A ribbon of radiation projection system comprising:
   a. a source of a beam of electromagnetic radiation;
   b. a bundle of substantially parallel dielectric waveguides;
   c. a cylindrical lens;
   d. incidence optics, optically coupled to the beam source, that directs the beam, to be incident to the bundle of dielectric waveguides at a predetermined angle of incidence to generate a plane of radiation;
   e. such that a portion of the plane of radiation is collimated by the cylindrical lens into a ribbon of radiation;
   f. wherein the dielectric waveguides are substantially cylindrical dielectic elements having media with radially varying dielectric constant or index of refraction.

6. A method of projecting a substantially uniform ribbon of electromagnetic radiation, comprising the steps:
   a. generating a beam of electromagnetic radiation;
   b. directing the beam to be incident to a bundle of dielectric waveguides wedged between plano-mirrors at a predetermined angle of incidence to produce a radiation field; and
   c. collimating the radiation field;
   d. such that a ribbon of radiation is projected.

7. The method of projecting a substantially uniform ribbon of electromagnetic radiation of claim 6, wherein the fiber-optic bundle is formed by fused fiber optic waveguides.

8. The method of projecting a substantially uniform ribbon of electromagnetic radiation of claim 7, wherein the fibers have characteristic transverse dimensions on the order of the wavelength of the radiation.

9. The method of projecting a substantially uniform ribbon of electromagnetic radiation of claim 6, wherein the angle of incidence of the beam of electromagnetic radiation is orthogonal to the major axis of said bundle of dielectric waveguides.

10. The method of projecting a substantially uniform ribbon of electromagnetic radiation of claim 6, wherein the step of directing is accomplished by a mirror that reflects the beam to the bundle of dielectric waveguides.

11. The method of projecting a substantially uniform ribbon of electromagnetic radiation of claim 6, wherein the beam of electromagnetic radiation comprises a laser beam.

12. The method of projecting a substantially uniform ribbon of electromagnetic radiation of claim 6, wherein the bundle of dielectric waveguides comprises a fiber-optic bundle.

13. A laser ribbon projection system that projects a substantially uniform ribbon of light, comprising:
   a. a laser beam source;
   b. a bundle of dielectric waveguides that is substantially cylindrical;
   c. plano-mirrors such that the bundle of dielectric waveguides is wedged in between;
   d. a plano-cylindrical lens; and
   e. incidence optics, optically coupled to the laser beam source, that directs the laser light beam to be incident to said bundle at a orthogonal angle of incidence;
   f. such that a substantially uniform ribbon of light is projected from said bundle.

14. The laser ribbon projection system of claim 13, wherein the bundle of dielectric waveguides comprises a fiber-optic bundle.

15. The laser ribbon projection system of claim 14, wherein the fiber-optic bundle is formed by fused fibers.

16. The laser ribbon projection system of claim 14, wherein the fibers have characteristic transverse dimensions on the order of the wavelength of the radiation.

17. The laser ribbon projection system of claim 13, wherein the incidence optics comprises a mirror that reflects the beam from the source to the bundle of dielectric waveguides.

* * * * *